Figure 1:
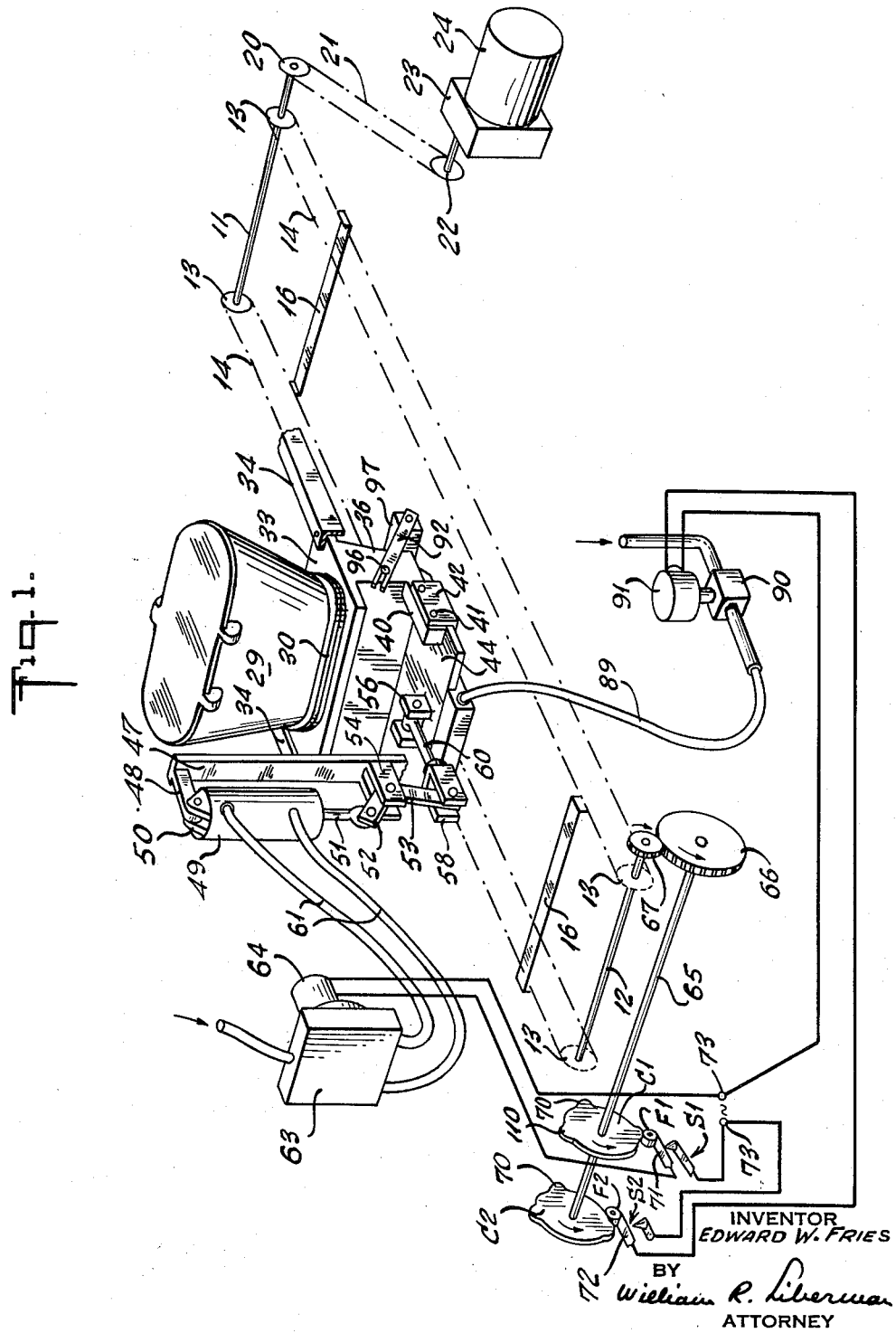

Dec. 15, 1964  E. W. FRIES  3,161,157
APPARATUS FOR PRODUCING COMESTIBLES
Filed Sept. 14, 1961  3 Sheets-Sheet 1

INVENTOR
EDWARD W. FRIES
BY
William R. Lieberman
ATTORNEY

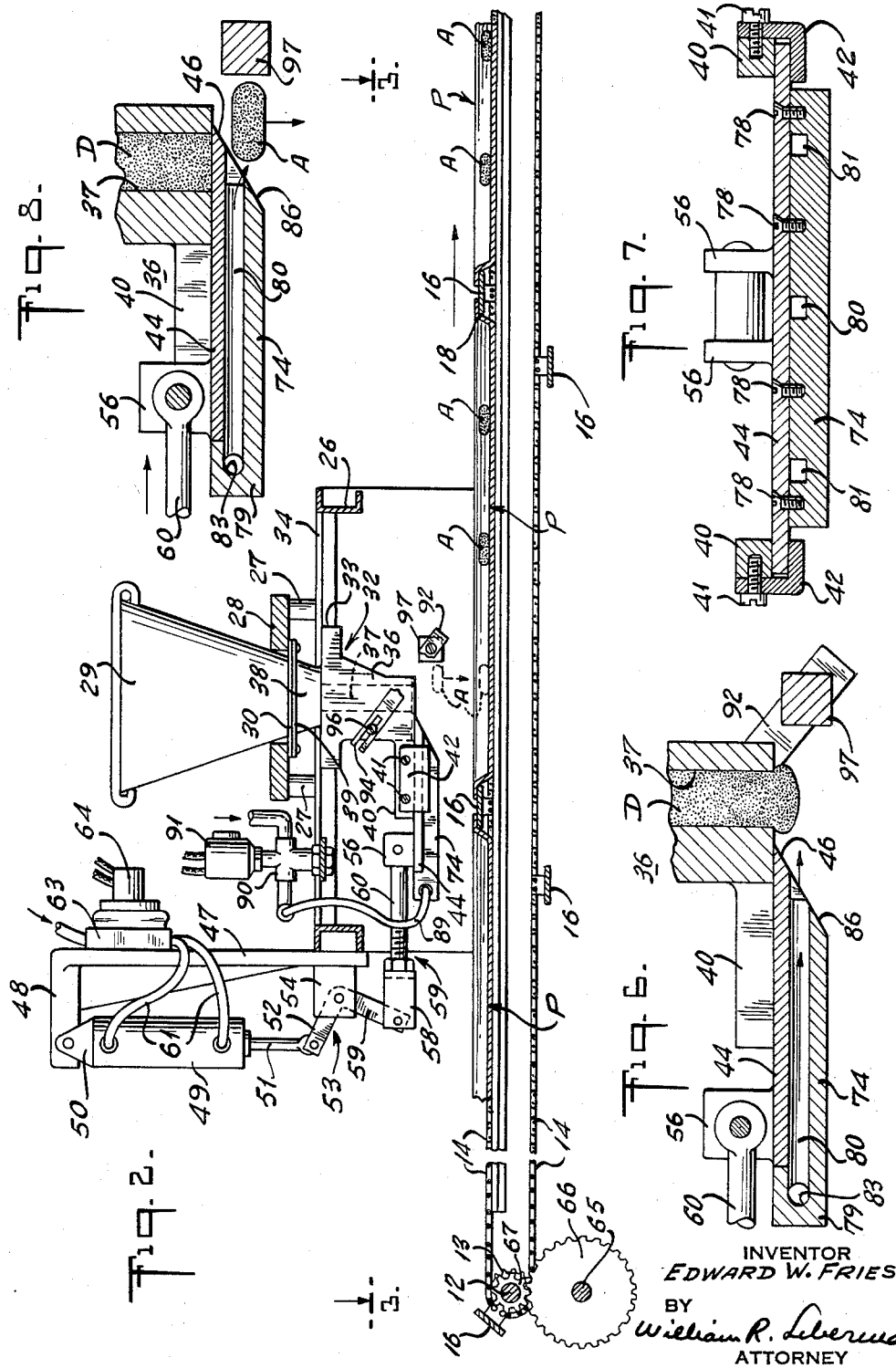

Dec. 15, 1964    E. W. FRIES    3,161,157
APPARATUS FOR PRODUCING COMESTIBLES
Filed Sept. 14, 1961    3 Sheets-Sheet 3
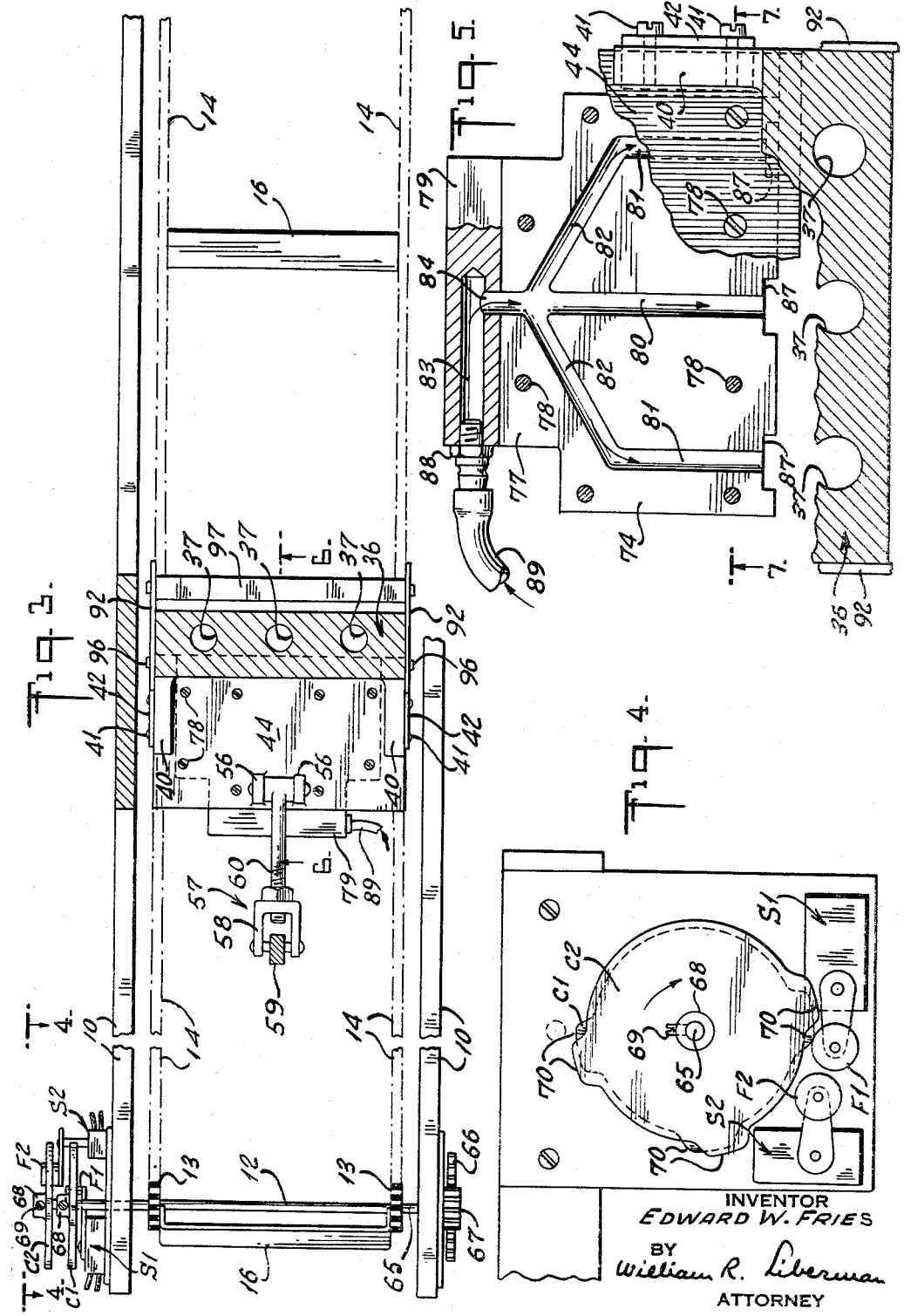
INVENTOR
EDWARD W. FRIES
BY
William R. Liberman
ATTORNEY United States Patent Office 3,161,157
Patented Dec. 15, 1964

3,161,157
APPARATUS FOR PRODUCING COMESTIBLES
Edward W. Fries, Baltimore, Md., assignor to DCA Food Industries Inc., New York, N.Y., a corporation of New York
Filed Sept. 14, 1961, Ser. No. 138,074
17 Claims. (Cl. 107—29)

The present invention relates generally to an improved apparatus for the production of comestibles. In particular, the present invention relates to an improved apparatus for automatically producing shaped pieces of dough and depositing them onto pans in a predetermined arrangement and orientation.

The commercial production of baked products of spiral or other complex shapes is quite costly and inefficient from the standpoint of time and labor involved in the particular process steps, and in the equipment and skill required in its operation. Thus, in the commercial production of, for instance, cinnamon rolls or similar items, fifteen to twenty pound batches of fermented dough are manually deposited on a belt conveyor, each batch being manually stretched and flattened, and successive pieces overlapped and pressed together to form a continuous piece or strip. The continuous strip is then passed through power driven sheeter rolls which further flatten the dough to the desired thickness. The sheet is thereupon delivered onto a second horizontal belt conveyor which must be accurately timed to the rate of delivery of the sheet from the rolls to minimize tearing. While carried on the second belt, the continuous dough sheet is subjected to numerous further operations including cross grain rolling, application at various stations of thin layers of filler such as oil and cinnamon, the curling the sheet laterally into a solid round helical roll by means of a curling bar, the continuous cutting of the dough roll by guillotine or rotary cutter means into pieces of the desired weight and length or thickness, and the manual panning of the cut dough pieces by placing the end showing the helical configuration of the bottom of the pan. It is apparent from the above, that the production of baked products, as typified by cinnamon rolls, is relatively inefficient, highly time and labor consuming and thus costly, and that it leaves much to be desired.

An apparatus for filling, shaping and cutting spiral cinnamon rolls is disclosed in U.S. Patent No. 2,982,231, granted May 2, 1961, to E. W. Fries. While the apparatus described in said patent operates quite satisfactorily, the cut pieces of dough do not fall uniformly from the nozzle therein, and it is difficult to obtain consistent spacing between and orientation of the cut pieces of dough, and frequently successive pieces of dough would overlap each other, a condition which is rather undesirable. Furthermore, it occasionally occurs, also, that the cut piece of dough adheres to the nozzle or cutter device and hence interferes with further operation.

It is, therefore, a principal object of the present invention to provide an improved apparatus for the production of shaped comestibles and for depositing them onto pans in a predetermined pattern and orientation.

Another object of the present invention is to provide an improved apparatus for continuously automatically cutting and depositing dough pieces in a predetermined pattern and orientation onto successively fed trays.

Still another object of the present invention is to provide an improved apparatus of the above nature characterized by its simplicity, ruggedness and uniform operation.

The above and other objects of the present invention will become apparent from a reading of the following description, taken in conjunction with the accompanying drawings, wherein FIGURE 1 is a perspective fragmentary and partially diagrammatic view of an apparatus constructed according to and embodying the present invention;
FIGURE 2 is a side elevational view thereof, partially in section and partially broken away;
FIGURE 3 is a sectional view taken along line 3—3 of FIGURE 2;
FIGRUE 4 is a sectional view taken a long line 4—4 of FIGURE 3;
FIGURE 5 is an enlarged detailed fragmentary plan view of the nozzle gate member;
FIGURE 6 is a sectional view taken along line 6—6 of FIGURE 3;
FIGURE 7 is a sectional view taken along line 7—7 of FIGURE 5; and
FIGURE 8 is a sectional view similar to FIGURE 6, illustrating the gate member in its advanced position.

In a sense, the present invention contemplates the provision of a dough forming apparatus comprising a nozzle having a discharge opening formed therein, means for extruding dough through said discharge opening, a dough gate and severing member, means reciprocating said gate and severing member across said discharge opening, and means directing a stream of high velocity air across a zone adjacent said discharge opening.

According to a preferred form of the present invention, the nozzle is connected to a hopper containing dough under pressure and includes a plurality of transversely spaced downwardly directed discharge openings. The gate member comprises a track supported plate having a leading cutter defining bevelled edge and movable along the discharge openings between an advanced closed position and a retracted open position. A pneumatically motivated cylinder and piston reciprocates the gate and is connected to a compressed air source by way of a solenoid actuated valve. A block is affixed to the underface of the gate plate and is provided with a plurality of longitudinal grooves confronting the gate plate and delineating therewith a plurality of conduits terminating in forwardly directed apertures disposed rearwardly of the cutting edge and connected by way of a common conduit and solenoid actuated valve to a source of compressed air. A transversely extending baffle is adjustable positioned below and forward of the discharge openings. An endless conveyor transports trays in end-to-end relationship along a longitudinal path disposed below the discharge openings. A pair of switches, operated substantially simultaneously, are periodically actuated in timed relationship with the conveyor to reciprocate the gate member and open the air valve to the aperture conduits.

Referring now to the drawings, which illustrate a preferred embodiment of the present invention, the improved apparatus comprises a main support frame including a pair of transversely spaced longitudinally extending horizontal structural members generally designated by the reference numeral 10 and suitably supported by vertical legs. Journalled to and between the front and rear sections of the structural members 10 are front and rear transverse shafts 11 and 12. Affixed to shafts 11 and 12 between the structural members 10 is a pair of transversely spaced sprocket wheels 13 which engage and support corresponding longitudinally extending parallel sprocket chains 14. A plurality of transversely extending horizontal cross-bars 16 are regularly longitudinally spaced along the length of the sprocket chains 14 and are each provided with a pair of depending end brackets which are secured to opposite sprocket chains 14 so as to move therewith.

Cooperating with the sprocket chain-carried flights 16 are pans P which are separably supported in end-to-end relationships by and between successive cross-bars 16 along their upper advancing run. Each pan P includes a flat rectangular base 17 including front and rear upwardly outwardly inclined end walls 18 terminating in outwardly directed longitudinal lips or flanges 19. Pan P is so dimensioned that it nests between successive crossbars 16, with the inner edge of each lip or flange 19 coinciding substantially with corresponding edges of the flights 16, and the outer edges of each flange 19 reaching just short of the medial axis of the cross-bar 16. Pans P are readily deposited into and shifted from registry with successive pairs of cross-bars 16. In order to advance cross-bars 16 and pans P, a sprocket wheel 20 is affixed to an end of front shaft 11 and is coupled by a sprocket chain 21 to a sprocket wheel 22 which is mounted on the output shaft of a variable spaced reducing unit 23 driven by an electric motor 24.

Supported atop and spaced above the main support frame is a supplementary support frame 26 of rectangular configuration and formed of structural channel members. Mounted on support frame 26, by means of upright posts 27, is a cradle plate 28 having a medially located elliptical opening formed therein having a transversely extending major axis. A funnel shaped dough hopper or reservoir 29 registers with and projects through the cradle plate opening and is provided with an elliptically shaped bottom opening having a peripheral flange 30 underlying the cradle plate 28 along the border of the opening and secured thereto by screws. Hopper 29 is of the well known pressure type, provided with a removal lid or cover which is releasably locked in position for sealing the hopper interior, the hopper being connected to a source of compressed air at an adjustable presure whereby to urge the dough contained in the hopper 29 downwardly through the throat thereof.

A transversely extending extrusion die or nozzle 32 is located below and in vertical alignment with the dough hopper 29. Nozzle 32 includes an upper rectangular plate 33 secured along its side edges to the longitudinally extending structural members 34 of supplementary frame 26. Depending from plate 33 is a block 36 having a plurality of transversely spaced vertical extrusion bores 37 formed therein. It should be appreciated that while bores 37 are illustrated as being of circular transverse cross-section, they may assume other configurations, as desired. Directed upwardly from plate 33 is a coupling conduit 38 provided at its upper edge with a peripheral flange 39 coinciding with an underlying flange 30 and suitably secured thereto by the screws fastening flange 30 to plate 28. Coupling conduit 38 affords communication between dough hopper 29 and the extrusion bores 37, the latter treminating in downwardly directed discharge openings confronting the trays P as they are transported by sprocket chain conveyor assembly.

The underface of block 36 is substantially flat and horizontally extending, and a pair of transversely spaced horizontal longitudinally extending parallel rectangular bars 40 projects rearwardly from the bottom side borders of the rear face of said block 36. Secured to the outer face of each bar 40, by means of screws 41, is a track or guide defining longitudinally extending angle member 42 having a vertical web abutting the outer face of the corresponding bar 40 and a horizontally and inwardly extending web or shoulder spaced below and parallel to the underface of bar 40 to delineate therewith a longitudinally extending, inwardly directed pair of tracks or slots 43. A gate and cutter defining plate 44 of rectangular configuration has its longitudinally extending side borders disposed within and slidably registering with the tracks or slots 43, and is provided with a flat top face parallel to and slidably abutting the flat underface of die block 36. The leading edge of gate plate 44 is rearwardly downwardly bevelled from the top thereof to define a transversely extending cutter edge 46 which is movable with plate 44 across the nozzle discharge openings along a forward stroke to an advanced position as illustrated in FIGURE 8 of the drawings, wherein gate plate 44 closes the discharge openings, and along a return stroke to retracted position as illustrated in FIGURE 6, wherein the discharge openings are unobstructed and the cutter edge 46 is disposed rearwardly thereof.

The mechanism for reciprocating cutter gate 44 includes a vertical post 47 secured to and extending upwardly from the rear of frame member 26 and provided with a rearwardly directed bracket arm 48 at its upper end and a pair of transversely spaced rearwardly directed bracket arms 54 adjacent its lower end. A double acting pneumatic cylinder 49 depends from the free end of arm 48 and is provided at its top with a yoke 50 which is pivoted to arm 48. Associated with the cylinder 49 is a registering slidable piston provided with a piston rod 51 pin-connected at its lower end to the rearwardly directed arm 52 of a bell crank 53 rockably supported at its knee by and between bracket arms 54. A pair of transversely spaced upwardly directed bracket legs 56 are mounted along the trailing edge of the gate 44. A link 57 is provided with a trailing yoke member 58 pin-connected to depending arm 59 of bell crank 53 and is adjustably mounted on a connecting rod 60, the leading end of which is pin coupled to and between bracket legs 56.

The opposite ends of cylinder 49 are connected by flexible tubes 61 to respective outlet ports of a four-way valve 63 which is mounted on post 47 and actuated by an associated solenoid 64. The inlet ports of valve 63 are respectively connected to a source of compressed air and the atmosphere so that upon energization of solenoid 64 the upper end of the cylinder 49 is connected to the compressed air source and the lower end is connected to the atmosphere, to lower piston 51, and upon deenergization of solenoid 64 the lower end of the cylinder 49 is connected to compressed air and the upper end of the atmosphere to raise piston rod 51. Thus, energization of the solenoid 64 advances gate 44 and de-energization thereof retracts gate 44 by way of the bell crank 53 and link 57.

A transverse shaft 65 is journalled below the conveyor shaft 13 and has affixed to an end thereof a gear 66 which engages a gear 67 mounted on an end of shaft 12 extending outwardly of a sprocket 13. A pair of timing cams C1 and C2 respectively are affixed to the opposite end of shaft 65 by means of hubs 68 registering with the shaft 65 and provided with screws 69 to permit individual angular adjustment of cams C1 and C2 on shaft 65. Each of cams C1 and C2 includes a plurality of regularly spaced raised sections 70, illustrated as three in number, separated by intervening depressed sections. A normally open switch S1 is associated with cam C1 and includes a swingable actuating arm 71 which carries at its free end a follower roller F1 engaging cam C1. Arm 71 is spring urged with the follower F1 toward cam C1, and when follower F1 is engaged by a raised cam section 70 switch S1 is closed, and when it registers with a depressed section switch S1 is open. Similarly, a switch S2 provided with a swingable actuating arm 72 and a cam follower F2 associated with cam C2, which switch is closed when follower F2 engages a raised section 70 of cam C2 and opened when it registers with a depressed section thereof.

It should be noted that the raised sections 70 of cam C1 lead the raised sections 70 of cam C2 a few degrees in the clockwise rotation of the cams as viewed in FIGURE 4 of the drawing so that the closing and opening of switch S1 occurs shortly before that of switch S2, although this may be adjusted as aforesaid. The valve operating solenoid 63 is connected by way of switch S1 to the terminals 73 of a source of electric current.

A manifold block 74 is affixed to the bottom of the gate 44 and includes a plate section 76 provided with a rearwardly directed tongue 77 of reduced width, the top face of plate section 76 and tongue 77 being in confronting abutment with the underface of the gate 44 and being affixed thereto by screws 78 provided with heads nesting in countersunk bores formed in gate plate 44. A transversely extending block 79 of increased thickness is disposed along the trailing edge of the tongue 77 and includes a front face tightly abutting the trailing face of gate plate 44. Formed in the top face of block plate 76 are a medial longitudinal groove 80 extending the full length of the plate 76, and a pair of symmetrically oppositely spaced longitudinally extending side grooves 81 extending to the front of plate 76 and joined at their trailing ends by connecting grooves 82 to medial groove 80 just forward of its trailing end. Formed in block 79 is a transverse bore 83 which communicates with groove 80 by way of a radial port 84 formed in the wall of the block 79 and extending to a point below the top face of tongue 77. Grooves 80, 81 and 82 delineate, with the overlying gate plate 44, corresponding conduits which communicate with the bore 83. The leading face of plate 76 is bevelled as at 86 and is positioned to lie in a common plane with the bevelled edge 46 of gate plate 44. Formed in the bevelled face 86 are a plurality of transversely spaced recesses 87 which register with the leading ends, or forwardly facing apertures of the conduits 80 and 81.

Bore 83 is connected by means of a registering screw coupling member 88 and a flexible hose 89 through a normally closed valve 90 to a source of compressed air. Valve 90 is actuated by a solenoid 91 which, when energized, opens valve 90, and closes the valve 90 when de-energized. Solenoid 91 is connected through the switch S2 to the electric current terminals 73. Upon the cam closing and opening of the switch S2, solenoid 91 is energized and de-energized to open and close valve 90 to effect the emission of blasts of air from each of the forwardly directed exhaust apertures 87 terminating the conduits 80 and 81.

A pair of longitudinally and angularly adjustable arms 92 are mounted on opposite sides of nozzle block 36. Each arm 92 has a longitudinal slot 94 formed in its trailing end engaged by a screw 96 registering with a correspondingly tapped bore in block 36. Arms 92 are forwardly downwardly inclined, and support between their leading ends a transversely extending baffle-defining bar 97 of rectangular cross section. Block 97 is preferably coated or covered with a non-wetting non-sticking material such as Teflon or the like. Block 97 is rotatably adjustable about its longitudinal axis and is vertically and horizontally adjustable relative to the underface of the block 36 by means of the support arms 92. Block 97 is advantageously adjusted with its rearwardly directed face substantially vertical and just forward of and below the leading bottom edge of the baffle block 97.

In operation, hopper 29 is filled with dough, closed and air pressure applied thereto, whereafter drive motor 24 is energized to advance sprocket chains 14. Pans P are deposited on and between successive cross-bars 16 on the upper run and are carried along a longitudinal path extending below the nozzle discharge openings. With the advancing pans P, the cams C1 and C2 rotate in synchronism therewith, driven by spur 67, driven gear 66 and shaft 65. Gate 44 is normally in its retracted position, and the dough D is urged through the extrusion bores 37 and the downwardly directed discharge openings at a predetermined rate which is adjustable by varying the hopper pressure and dough viscosity. As a raised section 110 of cam C1 engages follower F1, switch S1 is closed to energize solenoid 64 and motivate valve 63 to introduce compressed air into the upper part of the cylinder 49 and to lower piston rod 51. Gate 44 is thereby advanced along its forward stroke, a piece of shaped dough A being severed from the extruded dough D at the underface of the nozzle block 36 by the cutting edge 46.

Shortly following the closing of switch S1, switch S2 is closed by the raised portion of cam C2 engaging the follower F2 to energize solenoid 91 and open valve 90. Blasts of high velocity air issue from the leading apertures of the conduits 80 and 81 and are directed against the dough piece A. Upon complete severance of the dough pieces A from the dough D, they are separated and completely freed by the air blasts from the gate 44 and nozzle 32 and travel either downwardly toward pan P or toward the baffle 97. Light dough pieces up to ¾ ounce in weight, by reason of the flow characteristics of the high pressure air blast as effected by the baffle 97, either very closely approach the baffle 97 in a substantially flat trajectory or strike the baffle 97 with minimum force so as neither to stick thereto nor to deform or disorient the dough pieces A. Such dough pieces drop vertically onto the underlying pan P. Heavier dough pieces will not normally strike the baffle plate, the jets of high velocity air sufficiently separating them from the cutter to permit their vertical drop into the pan P. Switches S1 and S2 are then sequentially opened by reason of the followers F1 and F2 registering with the depressed sections of cams C1 and C2 to return the mechanism to its initial position and to cut the air blasts. Pan P advances an increment, as do cams C1 and C2, and the above cycle is repeated to cut and deposit another rough of dough pieces A onto the pan P behind the previously deposited row. It should be noted that the cross-bars 16 and hence the adjacent ends of the pans P pass under the nozzle 32 when the switches S1 and S2 are open so that the dough is not cut during this period.

While there has been described and illustrated a preferred embodiment of the present invention, it is apparent that numerous alterations, additions and omissions may be made without departing from the spirit thereof. For example, the extrusion die may be provided with filling devices disclosed in the above-identified Fries patent.

Having now described the invention, what I claim and desire to secure by Letters Patent is:

1. A dough forming apparatus comprising a nozzle having a discharge opening formed therein, means for extruding dough through said discharge opening, a dough gate and severing member, means reciprocating said gate and severing member across said discharge opening, and means directing a stream of high velocity air having a component in the direction of reciprocation of said severing member across a zone along the underface of said severing member.

2. A dough forming apparatus comprising a nozzle having a discharge opening formed therein, means for extruding dough through said discharge opening, a gate member movable across said discharge opening alternatively to open and to close said discharge opening and having a leading severing edge movable therewith substantially along the plane of said discharge opening, and means directing a stream of high velocity air across the underface of said severing edge, said stream of air having a component in the direction of movement of said severing edge across said opening during the closing thereof.

3. A dough forming apparatus comprising a nozzle having a downwardly directed discharge opening, a gate member movable between a forward advanced position in closing registry with said discharge opening and a retracted position out of registry therewith, said gate being provided with an upper leading cutting edge movable with said gate across said discharge opening, and means for producing a stream of high velocity air flowing in a forward direction across the underface of said cutting edge.

4. An apparatus according to claim 3, including means for transporting a tray along a path below said nozzle.

5. An apparatus according to claim 3, wherein said air stream producing means includes a conduit mounted on said gate and having a forwardly directed aperture disposed rearwardly of said cutting edge and means connecting said conduit to a source of compressed air.

6. An apparatus according to claim 5, including a normally closed valve disposed in the path of said compressed air leading to said aperture, and means opening said valve during the advance of said gate.

7. An apparatus according to claim 3, including a baffle member disposed forward of and below said discharge opening.

8. A dough forming and depositing apparatus comprising a nozzle having a downwardly directed discharge opening, a reservoir of dough under pressure communicating with said nozzle, means for transporting a tray along a path below said discharge opening, a gate movable along a forward stroke to an advanced position in closing registry with said discharge opening and along a return stroke to a retracted position out of registry with said discharge opening, said gate member including a leading upper cutting edge movable therewith across said discharge opening, means periodically reciprocating said gate member along said forward and return strokes in timed relation with said tray transport means, a conduit mounted on said gate and movable therewith and having a forwardly directed aperture disposed rearwardly of and below said cutting edge, and means connecting said conduit to a source of compressed air.

9. An apparatus according to claim 8, including a normally closed valve disposed in the path of said compressed air to said aperture, and means periodically opening said valve during said forward stroke of said gate.

10. An apparatus according to claim 9, including a solenoid which is connected by way of a normally open switch to a source of electric current to actuate said valve, and including also a cam member rotated in timed relationship with said transport means and periodically closing said switch.

11. An apparatus according to claim 8, wherein the path of said gate stroke and said tray path are in substantially parallel directions.

12. An apparatus according to claim 8, wherein said tray transport means includes a pair of transversely spaced driven endless longitudinally extending parallel sprocket chains, and a plurality of regularly longitudinally spaced transversely extending cross-bars supported by and between said sprocket chains, said trays being releasably supported by and between successive cross-bars.

13. An apparatus according to claim 8, wherein said gate comprises a plate having a substantially flat top face slidably registering with the underface of said nozzle and including guide members supporting said gate and limiting it to longitudinal movement, the leading transverse edge of said plate being bevelled to define said cutting edge, said conduit comprising a block affixed to the underside of said plate and having a longitudinally extending groove formed in its top face confronting the underface of said plate.

14. An apparatus according to claim 8, wherein said nozzle has a plurality of laterally spaced downwardly directed discharge openings formed therein, said gate opening and closing said openings, and said conduit is provided with a plurality of forwardly directed apertures disposed rearwardly of said cutting edge and in alignment with said discharge openings.

15. An apparatus according to claim 8, including a transversely extending baffle member disposed forward of and below said discharge opening.

16. An apparatus according to claim 15, and including means to adjust the position of said baffle member relative to said discharge opening.

17. A dough forming and depositing apparatus comprising a nozzle having a downwardly directed discharge opening, a reservoir of dough under pressure communicating with said nozzle, means for transporting a tray along a path below said discharge opening, a gate movable along a forward stroke to an advanced position in closing registry with said discharge opening and along a return stroke to a retracted position out of registry with said discharge opening, said gate member including a leading upper cutting edge movable therewith across said discharge opening, a fluid operated cylinder and piston, said cylinder being connected by way of a first valve to a source of fluid under pressure and said piston being coupled to said gate whereby said piston and said gate are reciprocated upon opening and closing of said first valve, a conduit mounted on said gate and movable therewith and having a forwardly directed aperture disposed rearwardly of said cutting edge, means including a normally closed second valve connecting said conduit to a source of compressed air, and means periodically opening and closing said first valve and opening and closing said second valve in timed relationship to said transport means.

References Cited in the file of this patent

UNITED STATES PATENTS

| | | |
|---|---|---|
| 1,327,806 | Bunde | Jan. 13, 1920 |
| 2,383,536 | Elliott | Aug. 28, 1945 |
| 2,424,949 | White | July 29, 1947 |
| 2,509,047 | Stempel | May 23, 1950 |
| 2,615,518 | Hornbostel | Oct. 28, 1952 |

FOREIGN PATENTS

| | | |
|---|---|---|
| 413,825 | Germany | May 16, 1925 |